Oct. 30, 1928.
N. E. BUCK ET AL
1,689,323
CABLE JOINT
Filed Dec. 16, 1921
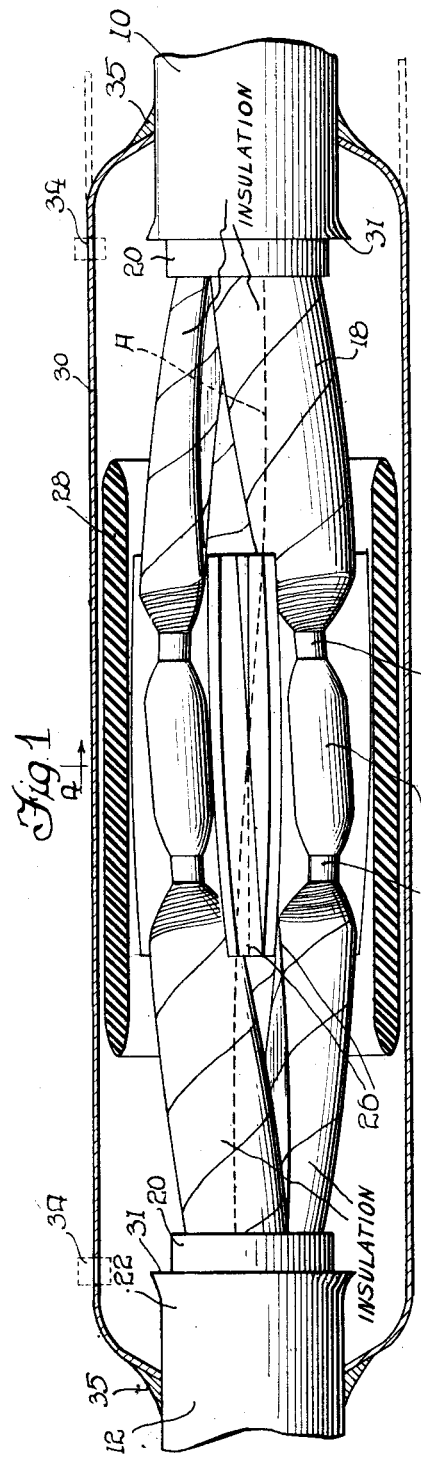
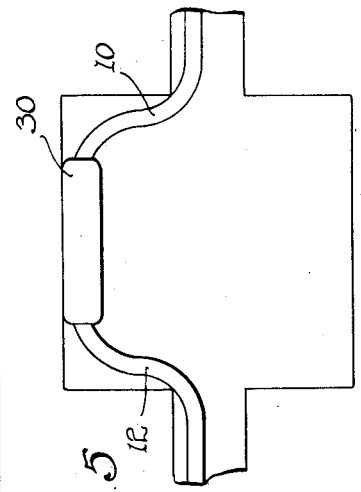
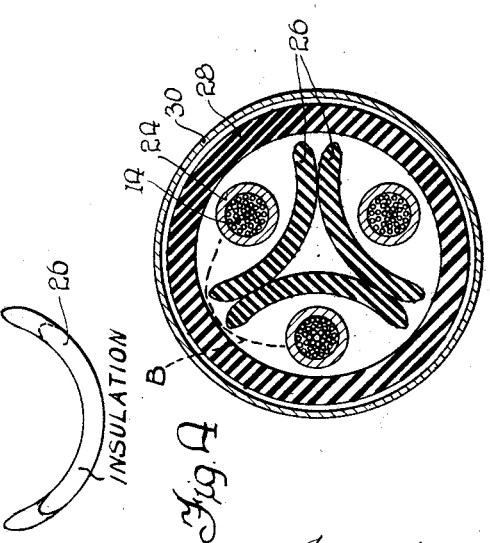
Inventors
Nelson E. Buck
Denney W. Roper
Alexander P. Thoms
By Brown Jortner and
Dinner Att'ys Patented Oct. 30, 1928.

1,689,323

UNITED STATES PATENT OFFICE.

NELSON E. BUCK, DENNEY W. ROPER, AND ALEXANDER P. THOMS, OF CHICAGO, ILLINOIS.

CABLE JOINT.

Application filed December 16, 1921. Serial No. 522,761.

The invention relates to connections between the ends of electrical conductors, and more specifically to an improved joint for uniting the ends of high tension underground electric cables and to a method of forming such a joint.

One object of the invention is to produce a built up joint which can be made at substantially the same cost as the well known hand wrapped tape joint.

Another object is to provide a joint which will be as near "factory made" as possible, i. e. all the parts employed will be made up in the factory. This is important, because in the factory the parts can be handled in a clean dry place, whereas while being installed the parts are exposed to the damp atmosphere of the manhole, to drippings from the roof or from the hands or faces of the workmen, and to dust and dirt blown into the manhole from the street. By providing a joint requiring a minimum of time for its assembly, these undesirable conditions are reduced to a minimum.

Another object is to provide a joint having substantially the same insulating strength, and no greater dielectric loss than the main cable.

Another object is to provide a joint employing separators, which is no longer or larger than a hand wrapped tape joint, as the conditions of installation frequently impose definite limits on the size of joint which can be employed.

One of the most frequent causes of failure in cable joints of the hand wrapped type, is the cracking or tearing of the insulation resulting from the mechanical deformation necessary in forming the joint. Another object of the invention is, therefore, to avoid distortion of the conductors as much as possible, and especially to reduce the straightening or change in the lay of the helically curved conductors of the cable.

Another object is to provide a joint from which it is relatively easy to expel all air when filling the same. This is facilitated by the use of separators and a sleeve so shaped as to reduce to a minimum the spaces within the joint from which it would be difficult to drive out the air by the filling compound.

Further objects and advantages of the invention will become apparent as the description proceeds.

In the accompanying drawings:

Figure 1 is a side view of a joint completed except for filling; the enclosing lead sleeve and outer insulator being in section to show the construction clearly.

Fig. 2 is an end view and Fig. 3 a side view of one of the separators employed;

Fig. 4 is a section on line 4—4 of Fig. 1; and

Fig. 5 is a diagrammatic layout of a manhole.

In the embodiment of the invention selected for illustration, the cable ends 10 and 12 each comprise a plurality of conductors 14 and 16 respectively, each conductor heavily covered with insulation 18. An outer insulating belt 20 encloses all the conductors, and a lead sheath 22 is usually employed for mechanical protection and to prevent the entrance of moisture.

By slightly changing the relative dimensions of the parts, such a cable can readily be designed for a system with grounded neutral or for a delta connected system. While we have illustrated a cable with three conductors, as this is the most common number in a multiple conductor cable, it will be obvious that the invention is applicable to cables having other numbers of conductors.

These cables are cabled or assembled with a helical lay or twist in the conductors, not unlike the twist in the strands in an ordinary rope, except that the angle of twist is much less. This permits of a round cylindrical exterior. It also permits the necessary bending of the cable during installation without injury to the cable and reduces the external inductive effect. The short projecting ends of the conductors with their individual insulating covers 18, are comparatively stiff and difficult to straighten. Furthermore, distortion of the conductors, especially by bending at a sharp angle, so they will lie parallel to axis of the joint, is a prolific source of weakness in such joints. The insulation 18 is usually laminated paper and a slight tear or rupture of a few layers of the insulation, may occur totally unobserved, until it manifests itself in a break down. To join conductor 14 to conductor 16, it is necessary to uncover the conductors by removing insulation 18, and as it has been found impracticable under the usual working conditions in manholes to attempt to put in insulation having sufficiently high dielectric strength to permit the joint to have the same diameter as the main cable, the joint portions of the conductors are spaced farther apart. This is further rendered necessary, by the increased diameter of the joined portions of the conductors, which are usually united by entering their abutting ends in copper sleeves 24 and uniting the conductor ends and the sleeve by means of solder.

The use of insulating sleeves around sleeve 24, necessitates a highly undersirable increase in the length of the joint, as the sleeve must be slipped over the conductors before they are united, and therefore the lead sheath and outer belt of insulation must be removed over a much greater length than is necessary merely for forming the joint itself. This is avoided by employing separators which can be slipped in sideways after the conductors have been soldered together. To reduce the distortion of the conductors to a minimum, we form the joint with the conductors helically disposed throughout the joint itself as well as the adjacent cable, and in this way avoid straightening of the conductors, which is otherwise necessary, and employ a very simple form of separator to facilitate assembly in this way.

Referring to the drawings, and especially to Figs. 1 and 2, it will be noted that the insulating separator 26 is of uniform cross section throughout except for tapering at the ends, and of the ordinary cylindrical shape, but it is cut with its longitudinal edges curved or convex in shape as shown in Fig. 3. The conductors lie in the passages formed by the separators with a twist or lay preferably a trifle less, but substantially the same as in the cable. In Fig. 1 the center line of the rear conductor is indicated by dotted line A for the sake of clearness.

The axes of the separators are disposed at an angle to each other and at angle to the axis of the insulating sleeve. Obviously since the separators are merely portions of cylinders they will only have point contact with each other. The point contact feature is a highly desirable one since it enables the filling compound to completely fill all spaces between the separators thus eliminating voids. Also the longitudinal edges of each separator are of necessity made convex in shape so as to enable these edges to contact the inner periphery of the enclosing sleeve. The curved longitudinal edges of the separators are clearly illustrated in Fig. 3. Furthermore, these curved edges are adapted to make line contact with the inner periphery of the sleeve.

A large insulating sleeve 28 is slipped over one cable before sleeves 24 are soldered in place, and, after separators 26 have been inserted, it is slipped back to the position shown in Fig. 1. It should be noted that separators 26 and sleeve 28 all have tapered or rounded edges, and that the separators do not fit tightly in the sleeve. This is for three reasons, first, under high dielectric stress, any element having a different dielectric strength from the medium surrounding it, is apt to concentrate the stresses so as to overstrain the insulation wherever it has a sharp edge or point, second, the loose fit permits of easy assembly, and third, it is also advantageous in the finished joint because the filling compound which is poured into the joint, after all the other parts are in place, can more easily percolate between the parts to drive out all the air and fill the entire space without forming any air bubbles or pockets.

Upon reference to Fig. 1, it will be seen that insulating sleeve 28 projects beyond separators 26 at both ends. This is not necessary primarily for purposes of dielectric strength, as the resistance of the path from the naked conductors 16 and 14 to the outer lead shell 30 would probably be sufficient if sleeve 28 were of the same length as separators 26; but we have found it highly advantageous for two reasons, first it prevents careless or accidental indentation of the outer shell 30, which might diminish the effective resistance of the shortest path to the shell, and second, slight accidental misplacement of the insulating sleeve 28, axially, will have no damaging effect.

The importance of certain details is apt to be underestimated unless the vast size of the installations depending for continuous operation on such cable is considered; and the damages, amounting occasionally to catastrophes, which may result from a failure of equipment of this kind to function properly. The factor of length for instance, will be seen to be of prime importance upon reference to Fig. 5, which is a diagrammatic layout of a manhole with a cable joint in position therein. The radius of curvature to which the cable itself may be bent, must not be less than a predetermined amount, to avoid damage to the cable. It will be apparent that an increase in the length of the joint beyond a predetermined amount, would leave only two alternatives open; first, the joint could not be used, or second, all manholes previously constructed would have to be dug out and enlarged.

In forming a joint according to the present invention, the ends of the cables are put into juxtaposition, and sheath 22 is cut away to the precise point called for by specifications giving the dimensions of the finished joint, and belled outwardly as indicated at 31. Insulating layer 20 is next cut away so that it will project beyond sheath 22 as shown in the drawings. Conductors 14 are bent radially outward, their helical inclination slightly reduced, and bared of insulation 18. Two holes 34 are formed adjacent to the opposite ends of the outer lead sleeve 30, and it is slipped back over one of the cable ends. The end of the other cable is wrapped in clean dry cloth and sleeve 28 is slipped back over it, using extreme care that the inside of the tube does not touch the bare lead sheath. This is necessary because a lead mark on the surface of the insulating material would form a conducting path which might allow current to flow from the copper conductor to the lead sheath and cause the joint to break down.

The individual joints in sleeves 24 are formed with great care and soldered. After the soldering has been completed, the surplus solder is carefully removed and any sharp projections which might concentrate the dielectric stresses are removed with sandpaper and the surfaces carefully polished. The ends of the insulation 18 are tapered down to the shape shown in the drawings and one layer of paper is peeled off the outside of each conductor back to the belt insulation 20. This is to secure perfectly clean insulation free from contamination by acid, solder, or metal chips formed in joining the ends of the conductors. Separators 26 are then inserted and accurately centered in position. Sleeve 28 is then slipped in position over separators 26, and the outer lead sleeve 30 is brought down and accurately positioned by means of marks previously made on the lead sheath 22. The ends of lead sleeve 30 are then beaten in to meet the lead sheath and the sleeve is wiped to the sheath 22 as at 35. This completes the assembly of the parts shown in the drawings.

The joint is now inclined so that the holes 34 near its ends are at slightly different levels, and a molten insulating compound is poured into the joint, through a funnel inserted in the lower opening, the pouring being continued long after the joint is filled with the compound to impregnate the parts thoroughly with the compound, and eliminate all air bubbles or pockets. This pouring is done at first with the compound heated well above its melting point for a considerable period, to heat the solid parts inside the lead sleeve well above the melting point of the compound, and the temperature is then gradually lowered until the compound inside the joint begins to solidify and thereby stops the flow through the joint.

Any kind of filling compound which is suitable for use with other known types of formed insulation may be used to fill our novel joint. While we have described the preferred materials and manner of making the joint we do not intend to limit the invention thereby except as limitations are imposed by the prior art, as we may employ any suitable process of filling with the above described or other materials.

We have secured highly satisfactory results with sleeves 28 and separators 26 made of layers of manila rope paper wound on a hot mandrel and coated with a condensation product or shellac. Various materials may be used for this but these two are the ones which have been found preferable so far. Satisfactory results can also be secured when the sleeves 28 and separators 26 are made of layers of cotton fiber paper similarly cemented with bakelite and suitably heat treated. Of these substances, separators of the segmental shape shown can be formed which will stand the temperature necessary for filling with compound without warping or separation of the layers of paper. Manila rope paper, or paper made of manila rope, is also the best paper for this work of those which have been tested.

The filling compound should have a high dielectric strength, and a specific inductive capacity as near that of the separators as possible, to secure advantageous distribution of the dielectric stresses.

The shortest path from one conductor to the next through the filling compound is indicated by dotted line B in Fig. 4. The separators should be of such a thickness that the dielectric strength through the separators will be greater than that along the dotted line B of Fig. 4, and the separators and outer sleeve should be so proportioned and the filling compound so selected that the dielectric strength along the dotted line B will give the desired factor of safety.

Without further elaboration, the foregoing will so fully explain the gist of the invention, that others may, by applying current knowledge, readily adapt the same for use under various conditions of service, without eliminating certain features which may properly be said to constitute the essential items of novelty involved, which items are intended to be defined and secured to us by the following claims.

We claim:

1. In a cable joint for a plurality of conductors, means for splicing the ends of the conductors together, insulating separators for spacing said spliced conductors, and a sleeve for enclosing said separators, said separators each having curved longitudinal edges adapted to make line contact with the inner periphery of said sleeve and having its axis disposed at an angle to that of said sleeve and to that of each of the other separators.

2. In a cable joint for a plurality of conductors, means for splicing the ends of the conductors together, insulating separators for spacing said spliced conductors, said separators being positioned so as to make substantially point contact only with each other, and a filling substance for covering said separators, and the spliced conductor ends, said point contact aiding in the elimination of voids and gas pockets between the separators thereby preventing destruction of the insulation by ionization of trapped gases.

3. In a cable joint for a plurality of conductors, means for splicing the ends of the conductors together, insulating separators for spacing said spliced conductors, an insulating sleeve encircling said separators, said separators being loosely held in place within said sleeve with their edges contacting the inner periphery of the sleeve, said separators being positioned so as to make substantially only point contact with each other, and a filling substance for covering said separators and the spliced conductor ends, said point contact aiding in the elimination of voids and gas pockets between the separators thereby preventing destruction of the insulation by ionization of trapped gases.

4. In a cable joint for a plurality of conductors, means for splicing the ends of the conductors together, said separators each comprising a rigid section of formed insulation having curved longitudinal edges, an insulating sleeve encircling said separators, said separators being loosely disposed within said sleeve with their edges making line contact with the inner periphery of the sleeve, said separators being positioned so as to make substantially only point contact with each other, and a filling substance for covering said separators and the spliced conductor ends, said point contact aiding in the elimination of voids and gas pockets between the separators thereby preventing destruction of the insulation by ionization of trapped gases.

5. A cable joint insulating separator comprising a longitudinal section of a hollow cylinder of insulation, said section being defined by the intersection of the cylinder of which it is a section with a hollow right cylinder, the axes of said intersecting cylinders having no common plane.

6. A cable joint insulating separator comprising a longitudinal section of a hollow cylinder of insulation, said section being defined by the intersection of the cylinder of which it is a section with a hollow right cylinder, the axes of said intersecting cylinders having no common plane, the longitudinal edges of the separator being chamfered off to facilitate the introduction of the separator between conductors and to reduce the area of contact with a cooperating surface.

7. A cable joint insulating separator comprising a cylindrical plate of substantially uniform thickness, the longitudinal edges of which are adapted to lie in contact with the inner surface of a hollow cylinder, the axis of which hollow cylinder is skewed with respect to the axis of said cylindrical plate.

8. A joint for multiconductor cables in which the conductors of the cables to be joined have a lay or twist, comprising the combination of conductor ends joined electrically, and continuing substantially the lay of the conductors in the cables, insulating separators insertible laterally between the joined conductors, said insulators being skewed with respect to each other and following the lay of the joined conductors, an outer belt of insulation housing said separators and joined conductors and a filling of insulation in the space within said outer belt.

In witness whereof, we hereunto subscribe our names this 13th day of December, 1921.

NELSON E. BUCK.
DENNEY W. ROPER.
ALEXANDER P. THOMS.